May 31, 1927.　　　　　　　　　　　　　　1,630,499
F. A. ROSS
EXPANSIBLE SHACKLE BOLT AND THE LIKE
Filed June 9, 1921

Witness:

Inventor:
Frank A. Ross,
by Bowden Bowden
his Attys.

Patented May 31, 1927.

1,630,499

UNITED STATES PATENT OFFICE.

FRANK A. ROSS, OF WILMETTE, ILLINOIS, ASSIGNOR TO STEWART-WARNER SPEEDOMETER CORPORATION, OF CHICAGO, ILLINOIS, A CORPORATION OF VIRGINIA.

EXPANSIBLE SHACKLE BOLT AND THE LIKE.

Application filed June 9, 1921. Serial No. 476,128.

The purpose of this invention is to provide a spring shackle bolt or similar bearing member with means for adjusting its size by expansion to fit a bushing or other co-operating bearing member after the latter has become enlarged by wear in use. The invention consists in certain features and elements of construction hereinafter described and shown in the drawings as indicated by the claims.

In automobiles in which the vehicle springs are usually connected to the frame by means of bolts and shackle members, the constant play of the parts upon these bolts induces wear which soon results in an unpleasant rattle in operation of the vehicle and later becomes dangerous unless the bolts are frequently replaced. There are many other situations in which similar bearings subjected to limited rotative movement become worn and loose, but the automobile construction offers a convenient example for the purposes of this invention. In common practice shackle bolts are made of considerably greater cross-section than is necessary for strength alone, the purpose being to distribute the wear over a larger surface. Frequently the bolts are made of harder metal than the bushing so that the latter becomes enlarged before there is much appreciable wear on the bolts themselves. From the standpoint of the present invention, it is immaterial whether the bolt or the bushing is subjected to the greater wear; the adjustment means hereby provided will operate to compensate for the wear in either case.

Figure 1:
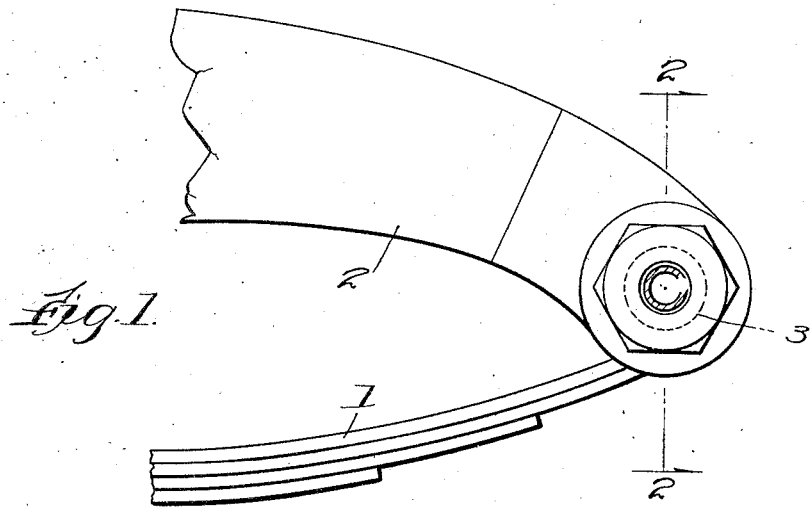
Figure 1 is a side elevation of the end portion of a vehicle frame and spring connected together by a shackle bolt embodying this invention.
Figure 2:
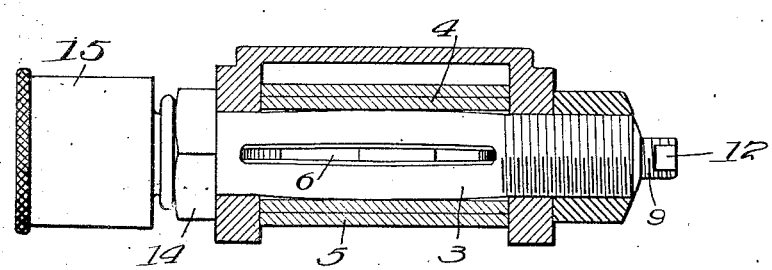
Figure 2 is a vertical section taken as indicated at line, 2—2, on Figure 1, and showing the bolt as expanded by adjustment to compensate for wear of the bushing.
Figure 3:
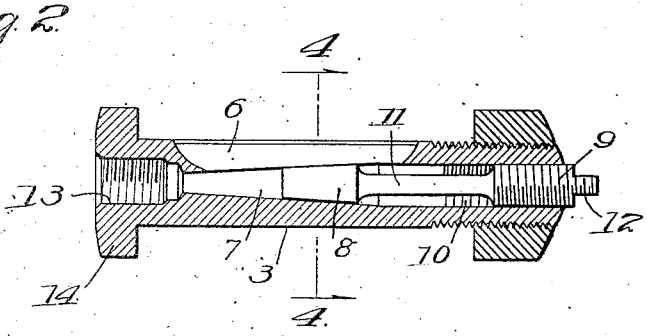
Figure 3 is an axial section of the bolt itself showing the adjusting means.
Figure 4:
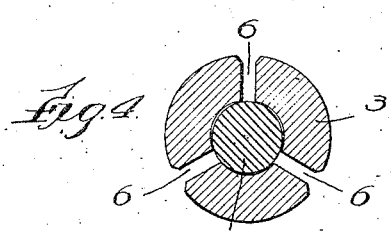
Figure 4 is a transverse section taken as indicated at line, 4—4, on Figure 3.

In Figure 1 the vehicle spring, 1, is shown connected to the end of the frame member, 2, by means of a shackle bolt indicated in dotted outline at 3, and shown in full lines in Figure 2. The latter view assumes that the bushing, 4, carried in the eye, 5, at the end of the spring has been enlarged by wear and the shackle bolt, 3, has been adjusted to take up the looseness between the parts. The bolt, 3, is formed with a plurality, preferably three, equally spaced longitudinal rifts or slots, 6, which communicate with a central tapered bore, 7, in the bolt. A tapered plug, 8, which approximately fits the bore, 7, is initially positioned therein near the middle of the length of the rift, 6, so that its further adjustment inwardly toward the smaller end of the tapered bore, 7, will tend to bend the walls of the bolt outwardly as indicated in Figure 2.

For thus adjusting the plug, 8, it is formed with a threaded head, 9, engaging a straight threaded bore, 10, in one end of the bolt 3, and beyond its rifted portion. The threaded head, 9, and the conical plug, 8, are shown connected by a reduced shank or stem, 11, and at its outer end the threaded part, 9, is provided with a flattened key, 12, to engage a wrench or pliers for adjusting the plug, 8.

Thus when the bushing, 4, has become enlarged or the bearing surface of the bolt itself has been reduced by wear so as to render the bolt loose in the bushing, a slight adjustment of the key, 12, will feed the tapered plug, 8, inwardly and expand the middle portion of the bolt to fit more snugly in the bushing. Obviously this will at first concentrate the wear on the middle portion of the bearing surface so that one or the other of the bearing elements will wear more rapidly at this area; but as such additional wear occurs it may be taken up by further adjustment of the key, 12, so that the bolt and bushing will gradually conform to each other in shape although the bearing surfaces will be bulged away from the axis at the middle portion instead of being straight cylinders as they were originally made.

It is common practice to lubricate shackle bolts by means of a grease cup or oil cup applied to the head of the bolt feeding into a central bore and thence through a radial or diametral cross bore to the surface. In the present construction, however, the rifts, 6, communicating with the central bore, 7, provide access therefrom so that merely by extending the smaller end of the tapered bore, 7, to connect with a threaded opening, 13, in the head, 14, the grease cup, 15, applied to said head of the bolt is placed in quite free communication with the bearing surfaces and will feed the grease or other lubricant thereto very effectively through the rifts, 6. This improvement in the supply passages for the lubricant will greatly reduce the rapidity of wear of the bearing surfaces so that with the better lubrication and with the provision for adjustment to take up any wear which may occur, the useful life of the shackle bolt will be greatly increased.

I claim:—

1. A hollow pivot having a bearing surface comprising a longitudinally rifted middle portion and unrifted end portions integral therewith and an expanding device arranged to flex said rifted portion outwardly for taking up wear of the bearing surface of the pivot.

2. A pivot having a bearing surface comprising a portion having a plurality of longitudinal rifts with an unrifted portion integral therewith at each end, said pivot having an interior cavity into which said rifts open and an expanding device in said cavity adjustable for enlarging the cavity and exteriorly expanding the rifted portion of the pivot.

3. In the combination defined in claim 2, the said cavity being an axially located and longitudinally tapered bore having a threaded cylindrical portion at one end and the expanding device including a conical plug dimensioned to fit the tapered bore and connected with a threaded portion engaging the threaded part of the bore, whereby rotative adjustment of said threaded portion will operate to advance the plug in the tapered bore for expanding the pivot.

4. In the combination defined in claim 2, the said cavity being longitudinally tapered and the expanding device including a plug in said tapered cavity with means for adjusting it longitudinally to expand the rifted portion of the pivot.

5. In the combination defined in claim 2, a reservoir for lubricant applied to said pivot member and communicating with its cavity for distributing lubricant therefrom through the rifts to the bearing surfaces.

6. In the combination defined in claim 2, the said cavity being an axially located and longitudinally tapered bore having a threaded cylindrical portion at one end and the expanding device comprising a conical plug dimensioned to fit the tapered bore and having a rigidly connected threaded portion engaging the threaded part of the bore, said threaded portion of the plug having a non-circular feature adapted to be engaged by a tool to rotate it for shifting the plug in the tapered bore, and means for supplying lubricant to the conical surface of the plug.

7. A shackle bolt provided with an outer bearing surface having a plurality of longitudinal rifts in its bearing surface and an interior cavity into which said rifts open, said cavity being longitudinally tapered and a tapered plug fitted therein, together with means for forcibly advancing said plug longitudinally in the cavity for expanding the bearing surface of the bolt.

8. In the combination defined in claim 7, said tapered cavity communicating at each end with a threaded bore leading out through the end of the bolt; a threaded head or plug engaged in one of said threaded bores and connected with the tapered plug for adjusting it longitudinally, and a grease cup secured in the other threaded bore for supplying lubricant to the bolt therethrough.

9. In combination with a cylindrical journal bearing; a hollow journal member having a plurality of longitudinal rifts in its bearing surface extending substantially throughout the length thereof and expanding means located approximately at the middle of the length of said rifts for bulging the middle portion of the journal to take up wear of the bearing surfaces.

In testimony whereof, I have hereunto set my hand at Chicago, Illinois, this 7th day of June, 1921.

FRANK A. ROSS.